United States Patent
Soininen et al.

(10) Patent No.: US 7,600,009 B2
(45) Date of Patent: Oct. 6, 2009

(54) CIRCUIT-SWITCHED AND PACKET-SWITCHED COMMUNICATIONS

(75) Inventors: Jonne Soininen, Helsinki (FI); Sami Uskela, Helsinki (FI); Harri Honko, Tampere (FI); Petri Koskelainen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/482,047

(22) PCT Filed: Jun. 28, 2002

(86) PCT No.: PCT/IB02/03164

§ 371 (c)(1),
(2), (4) Date: Jan. 26, 2004

(87) PCT Pub. No.: WO03/003767

PCT Pub. Date: Jan. 9, 2003

(65) Prior Publication Data
US 2004/0252674 A1 Dec. 16, 2004

(30) Foreign Application Priority Data
Jun. 29, 2001 (GB) ................................. 0115996.1

(51) Int. Cl.
*G06F 15/16* (2006.01)
(52) U.S. Cl. ....................... 709/223; 709/226; 709/228; 455/436
(58) Field of Classification Search ................ 709/220, 709/224, 227, 238, 245, 229, 219, 228, 223, 709/225, 226; 370/466, 389; 455/436, 438
See application file for complete search history.

(56) References Cited

U.S. PATENT DOCUMENTS

| | | | |
|---|---|---|---|
| 6,185,619 B1 * | 2/2001 | Joffe et al. | 709/229 |
| 6,343,318 B1 * | 1/2002 | Hawkins et al. | 709/219 |
| 6,363,209 B2 * | 3/2002 | Sako et al. | 386/94 |
| 6,452,915 B1 * | 9/2002 | Jorgensen | 370/338 |
| 6,721,565 B1 * | 4/2004 | Ejzak et al. | 455/436 |
| 6,760,775 B1 * | 7/2004 | Anerousis et al. | 709/238 |
| 6,862,622 B2 * | 3/2005 | Jorgensen | 709/226 |
| 2002/0026527 A1 * | 2/2002 | Das et al. | 709/245 |
| 2002/0062379 A1 * | 5/2002 | Widegren et al. | 709/227 |
| 2004/0210670 A1 * | 10/2004 | Anerousis et al. | 709/238 |

FOREIGN PATENT DOCUMENTS

| | | |
|---|---|---|
| EP | 1 021 053 A2 | 7/2000 |
| WO | WO 00/70893 | 11/2000 |

OTHER PUBLICATIONS

Russian Office Action dated May 23, 2006, with English translation.

* cited by examiner

*Primary Examiner*—Khanh Q Dinh
(74) *Attorney, Agent, or Firm*—Harrington & Smtih, PC

(57) ABSTRACT

A communication system can include a network having a first network access point and a second network access point and being capable of carrying data between the first network access point and the second access point via, for example, a packet-switched bearer and a circuit-switched bearer. The communications system can also include a first terminal configured to connect to the first network access point and a second terminal configured to connect to the second network access point. Each terminal can be capable of simultaneously supporting a packet-switched connection and a circuit-switched connection with the other terminal via the network as a single logical communication arrangement.

91 Claims, 4 Drawing Sheets

-----  CS connection
———  PS connection

CIRCUIT-SWITCHED AND PACKET-SWITCHED COMMUNICATIONS

This invention relates to establishing connections in a communication system such as a mobile telephony system.

FIG. 1 is a simplified diagram of one form of communications system. The structure of FIG. 1 is based on the architecture of the third generation (3G) UMTS mobile communication system. The system of FIG. 3 includes two user equipment devices or terminals (UE) 1, 2 which are capable of communicating by means of a network 3. Each of the terminals communicates with the network by radio, and gains access to the network 3 via a radio access network (RAN) 4, 5. The network 3 provides for two forms of communication between the terminals. Circuit-switched connections, for example for voice communication, pass between the radio access networks 4, 5 via mobile switching centres (MSC) 6, 7. Packet-switched connections, for example for data connections, pass between the radio access networks via serving GPRS support node (SGSN) 8, 9 and gateway GPRS support node (GGSN) 10,11.

Conventionally, when a connection is to be set up between two terminals the terminals decide on the basis of the nature of the proposed connection—for example the required data rate and the amount of delay that can be tolerated—whether to set up a packet switched connection or a circuit-switched connection. Some applications can be satisfied by either type of connection. For example, in many situations voice traffic can be carried satisfactorily over a circuit switched connection or a packet switched connection (for example by means of the SIP or H.323 protocol). Especially with packet switched connections data of more than one form can be carried over the link, so that (for example) voice and video data could be carried simultaneously. This provides a convenient way to implement enhanced services such as click-to-talk whiteboarding and chatting.

However, packet-switched voice is relatively new. In most existing networks voice traffic is carried almost exclusively over circuit switched links because in those networks packet switched links cannot be guaranteed to provide a sufficient quality of service; for example due to the possibility of there being delay that is excessive for voice traffic. It can be expected that in the future networks will be able to carry packet-switched traffic at a level of service that allows enhanced services of the types listed above to be supported reliably over packet-switched links. However, in the meantime, as demand for such enhanced services grows, there is a need to bridge the gap before packet switched networks of higher capability are generally available, and allow such enhanced services to be provided over more conventional networks.

Furthermore, even when networks of higher capability are available it can be anticipated that in many cases circuit-switched and packet-switched channels will be available. The inventors of the present invention have noticed that in order to balance the utilisation of bandwidth over both parts of the network it would be useful to have additional flexibility in the allocation of connections to the available forms of channel.

According to one aspect of the present invention there is provided a communication system comprising: a network having a first network access point and a second network access point and being capable of carrying data between the first network access point and the second access point by means of a first bearer and a second bearer; and a first terminal capable of connection to the first network access point and a second terminal capable of connection to the second network access point, each terminal being capable of simultaneously supporting a connection of a first type and a connection of a second type with the other terminal via the network as a single logical communication arrangement and wherein the connection of the first type is established at the commencement of communication between the terminals, and the connection of the second type is subsequently established between the terminals if a new type of data is introduced into the communication, the transmission of which is better supported by a connection of the second type.

According to a second aspect of the invention there is provided a method for communicating between a first terminal and a second terminal by means of a communication system comprising a network having a first network access point and a second network access point and being capable of carrying data between the first network access point and the second access point by means of a packet-switched bearer and a circuit-switched bearer; the method comprising: the first terminal connecting to the first network access point; the second terminal connecting to the second network access point; and each of the terminals simultaneously supporting a packet-switched connection and a circuit-switched connection with the other terminal via the network as a single logical communication arrangement and wherein a connection of one type is established at the commencement of communication between the terminals, and a connection of the other type is subsequently established between the terminals if a new type of data is introduced into the communication, the transmission of which is better supported by a connection of the other type.

According to a third aspect of the invention there is provided a terminal configured to connect to an access point of a network and of simultaneously supporting a connection of a first type and a connection of a second type with an other terminal via the network as a single logical communication arrangement, the terminal being configured to: establish a connection of the first type at the commencement of communication with the other terminal, and subsequently establish a connection of the second type with the other terminal if a new type of data is introduced into the communication, the transmission of which is better supported by a connection of the second type.

According to a fourth aspect of the invention there is provided a method of operating a terminal, the terminal being configured to connect to an access point of a network and of simultaneously supporting a connection of a first type and a connection of a second type with an other terminal via the network as a single logical communication arrangement, the method comprising the steps of: establishing a connection of the first type at the commencement of communication with the other terminal, and subsequently establishing a connection of the second type with the other terminal if a new type of data is introduced into the communication, the transmission of which is better supported by a connection of the second type.

According to a fifth aspect of the invention there is provided an application for a terminal, the terminal being configured to connect to an access point of a network and of simultaneously supporting a connection of a first type and a connection of a second type with an other terminal via the network as a single logical communication arrangement, the application being configured to: establish a connection of the first type at the commencement of communication with the other terminal, and subsequently establish a connection of the second type with the other terminal if a new type of data is introduced into the communication, the transmission of which is better supported by a connection of the second type.

According to a sixth aspect of the invention there is provided a method of operating an application for a terminal, the terminal being configured to connect to an access point of a network and of simultaneously supporting a connection of a first type and a connection of a second type with an other terminal via the network as a single logical communication arrangement, the method comprising the steps of: establishing a connection of the first type at the commencement of communication with the other terminal, and subsequently establishing a connection of the second type with the other terminal if a new type of data is introduced into the communication, the transmission of which is better supported by a connection of the second type.

Preferably the first bearer is a packet-switched bearer and the connection of the first type is packet-switched. Preferably the second bearer is a circuit-switched bearer and the connection of the second type is circuit-switched.

Preferably the terminals are arranged to perform an operation to establish the simultaneous packet-switched and circuit-switched connections by the steps of: establishing the circuit-switched connection; and each terminal transmitting its packet-switching address to the other terminal by means of the circuit-switched connection. Then preferably the terminals are arranged to establish the packet-switched connection by means of the packet-switching addresses transmitted over the circuit-switched connection.

Alternatively, the first bearer may be a circuit-switched bearer and the connection of the first type may be circuit-switched; and the second bearer may be a packet-switched bearer and the connection of the second type may be packet-switched. The terminals may be arranged to perform an operation to establish the simultaneous packet-switched and circuit-switched connections by the steps of: establishing the circuit-switched connection; and each terminal communicating with a proxy server of the network to obtain from the proxy server the packet-switching address of the other terminal. Then each terminal may be arranged to provide the respective proxy server with a network address of the other terminal and the proxy server is arranged to be responsive to that address to provide the packet-switching address of that other terminal. The network address may be an E. 164 number. Suitably the terminals are arranged to establish the packet-switched connection by means of the packet-switching addresses obtained by means of the proxy. The proxy may be a SIP proxy.

The packet-switching addresses are suitably internet protocol addresses.

The packet-switched addresses may be transmitted to the terminals by means of user-to-user signalling (UUS). The packet-switched addresses may be transmitted to the terminals by means of the session description protocol (SDP). Messages sent using UUS may conveniently be coded using the SDP protocol.

The terminals may be arranged to perform an operation to establish the simultaneous packet-switched and circuit-switched connections by the steps of: establishing the packet-switched connection; and each terminal transmitting its circuit-switching address to the other terminal by means of the packet-switched connection. Then the terminals may be arranged to establish the circuit-switched connection by means of the circuit-switching addresses transmitted over the packet-switched connection.

The circuit-switching addresses are preferably mobile subscriber integrated services digital network identities (MSISDNs), i.e. E.164 numbers.

Suitably the circuit-switching addresses are transmitted by means of the session initiation protocol (SIP).

The network is preferably a mobile communication network. The terminals are preferably mobile terminals. The terminals are preferably capable of communicating over the radio interface with the network. The network and/or the terminals may be operable according to the GSM, GPRS or UMTS systems or a derivative thereof. The network may comprise one ore more core networks.

The present invention will now be described by way of example with reference to the accopanying drawings, in which.

The present invention will be described by way of example with reference to the architescture of a 3G network. However, it will be understood that it can be applied to any other suitable form of network.

Numerous enhanced services that users of communication services are beginning to demand make use of both highly delay-critical data, such as voice information, and associated less delay-critical data. Examples of such less delay-critical data include images to support click-to-talk services, drawings that are to be shared in whiteboard services, and supporting data on participants' actions for supporting chat services. In each of these cases, voice data should be carried as normal with minimal delay, but the supporting data can tolerate more delay. As will be described below, these services can be conveniently supported by means of simultaneous circuit-switched and packet-switched links between common end-points or terminals. Such an arrangement can be implemented in a network of the schematic form shown in FIG. 1, but with the terminals/user equipment and the network-side components having the architecture and capabilities described below.

Figure 1:
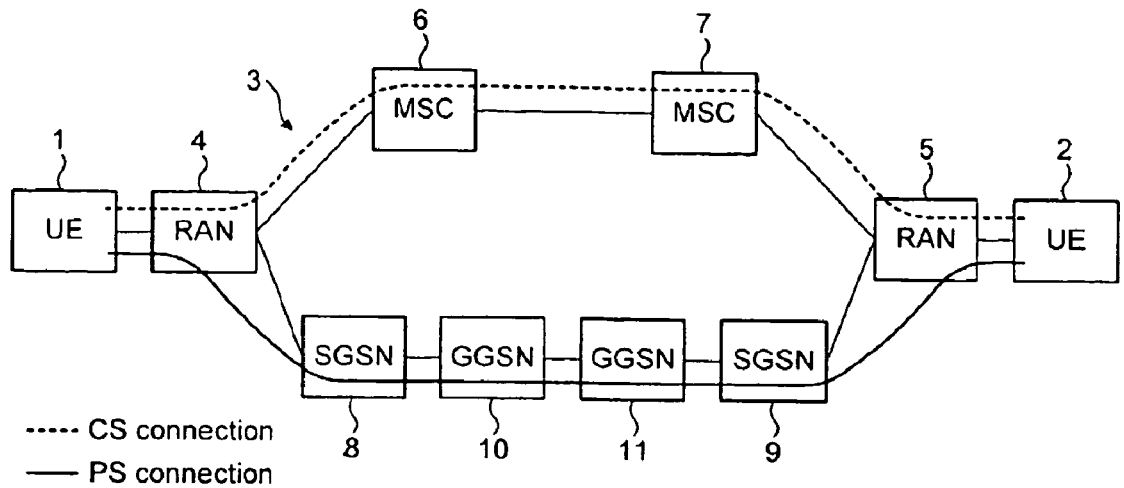
FIG. 1 is a schematic diagram of a communication network.
Figure 2:
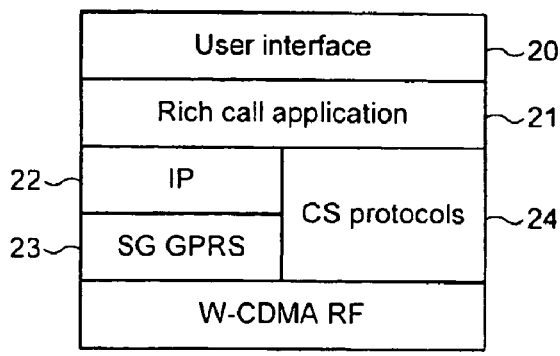
FIG. 2 shows a simplified functional architecture of a user equipment terminal.

FIG. 2 shows the functional architecture of a terminal suitable for acting as UE 1, 2 in the architecture of FIG. 1, and providing for simultaneous circuit-switched and packet-switched links between common end-points. The upper level 20 of the architecture is the user interface, which handles the interaction between lower-level components and the user. Below the user interface 20 is an application 21 running on the terminal. In this example the application is one that can support enhanced or "rich call" services. Below the application are the layers that format outgoing data or process incoming data according to packet-switched or circuit-switched requirements. In this example, the packet-switched (PS) layers comprise an upper internet protocol (IP) layer 22 and a gateway general packet radio service (G-GPRS) layer 23. The circuit switched (CS) processing is handled by a CS protocols layer 24. The PS- and CS-specific layers are effectively in parallel. Below the PS and CS layers is the radio interface to the 3G wide-band CDMA (W-CDMA).

In providing a rich call service the rich-call application (RCA) 21 is capable of communicating with both the PS-specific functionality 22, 23 and the CS-specific functionality 24. The RCA coordinates usage of CS and PS connections and provides a coherent user experience through the user interface when the service is in use.

When one terminal of the type illustrated in FIG. 2 is to communicate with another such terminal by means of a rich call service, the users of each terminal activate applications 21 on their respective terminals to support the service. The applications negotiate with each other over the network 3 to determine how the service is to be provided. One possible arrangement is for the terminals to agree that more delay-critical data, such as voice data, will be sent over a circuit-switched connection between the terminals and that less delay-critical data, such as associated visual or descriptive data, will be sent over a packet-switched connection between the same terminals. Once the terminals have established that they both support such an arrangement and have agreed to proceed, the terminals establish simultaneous circuit-switched and packet-switched connections over the network, and then proceed with communication to provide the service.

One preferred means by which the PS connection may be provided is the internet protocol (IP). In this case, the terminals should know each others' IP addresses and the port numbers that are to be used in order to set up the combined CS and PS connection. This information could be communicated between the terminals using user-to-user signalling (UUS), for example. One specific approach is to use the session description protocol (SDP) with is defined in RFC-2327.

The information on terminals' IP addresses etc. could be sent during the call setup process or later during the call, for example if the users decide during a conventional call to activate an enhanced service. In normal circumstances the former approach would be preferred.

Figure 3:
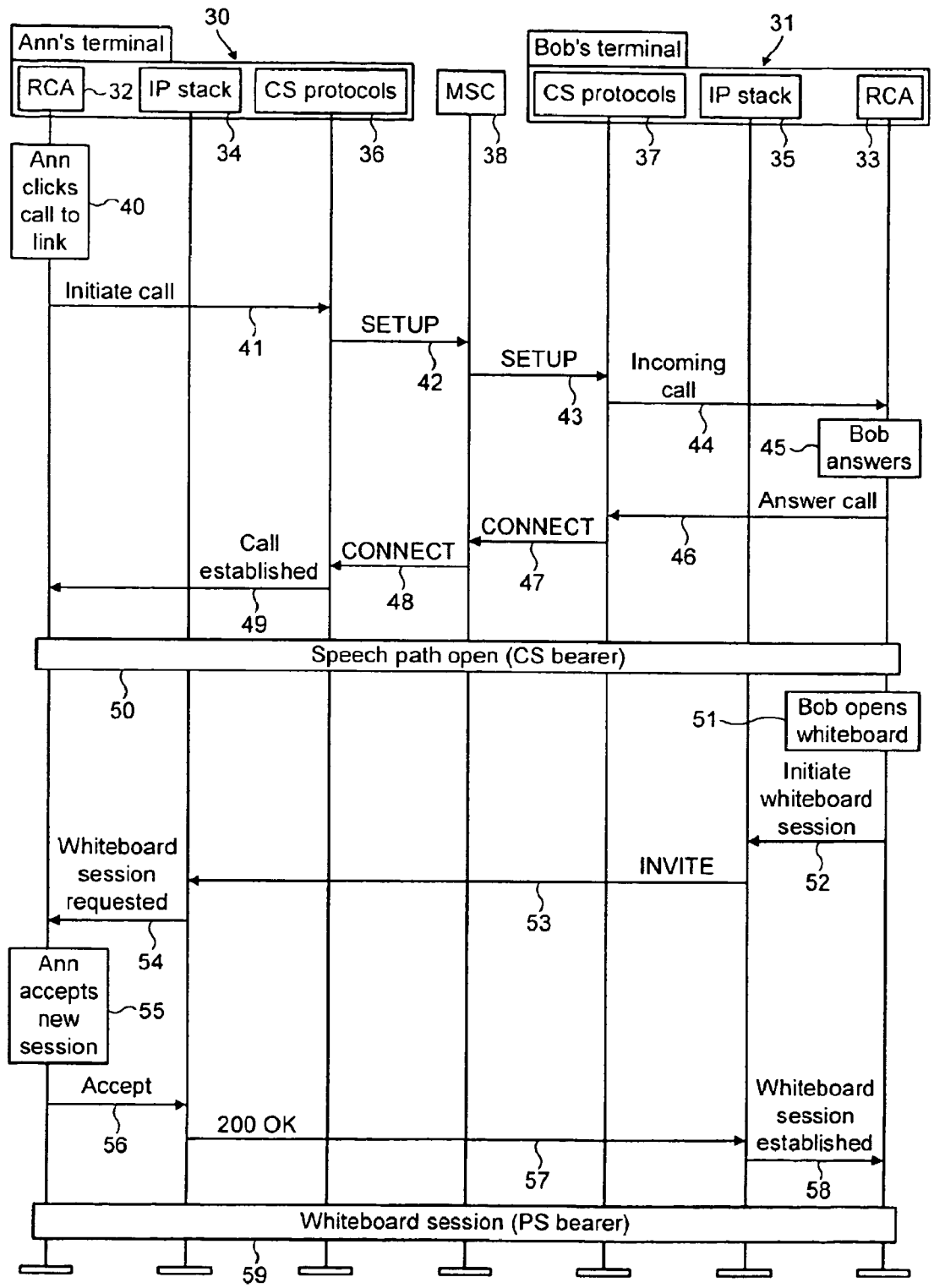
FIG. 3 shows message flow during the setup of a whiteboard communication session.

An example of the operation of the setup procedure will be described with reference to FIG. 3. The example of FIG. 3 shows the setting up of a whiteboard session between users termed Ann (A) and Bob (B). FIG. 3 shows A's terminal 30 and B's terminal 31. Each terminal includes a rich call application 32, 33; an IP stack 34, 35 for handing PS communications; and a CS protocol processing arrangement 36, 37 for handling CS communications. The terminals are connected for CS communication via a mobile switching centre 38 of the network. For simplicity the PS units of the network are not shown.

In this example it is assumed that both terminals initially have active PDP contexts with assigned IP addresses. Otherwise, this could be arranged before further setup proceeds.

In the process illustrated in FIG. 3, Ann's terminal displays an icon on which Ann clicks (at 40) to initiate a call. The RCA 32 interprets the request and determines that it would be preferred to satisfy the request for a call by means of a CS connection. Accordingly, the terminal 30 and the terminal 31 communicate in the normal way as shown in steps 41 to 50 to establish a CS call between the terminals and to open a path for speech using a CS bearer channel.

The terminals 'suitably exchange SDP information with each other via UUS during call setup.

Then Bob decides to open a whiteboard session (at 51). The RCA 33 determines that parallel CS and PS connections should preferably be used to satisfy the requirement for voice and whiteboard data. Accordingly, the application 33 signals the IP, stack 35 to initiate the whiteboard session (at 52). With knowledge of the IP address of terminal 30 the terminal 31 signals terminal 30 to invite it to initiate a whiteboard session over a parallel PS link (at 53). The IP stack 34 signals the RCA 32 that a whiteboard session is requested (at 54). Ann indicates via the user interface of terminal 30 that she accepts the whiteboard session (at 55). RCA 32 sign is to IP stack that the request is accepted (at 56) and IP stack 34 returns a 200 OK message (at 57) to IP stack 35, which indicates (at 58) to the RCA that the whiteboard session is established. The whiteboard session may then continue using a packet-switched bearer channel, as indicated at 59.

Figure 4:
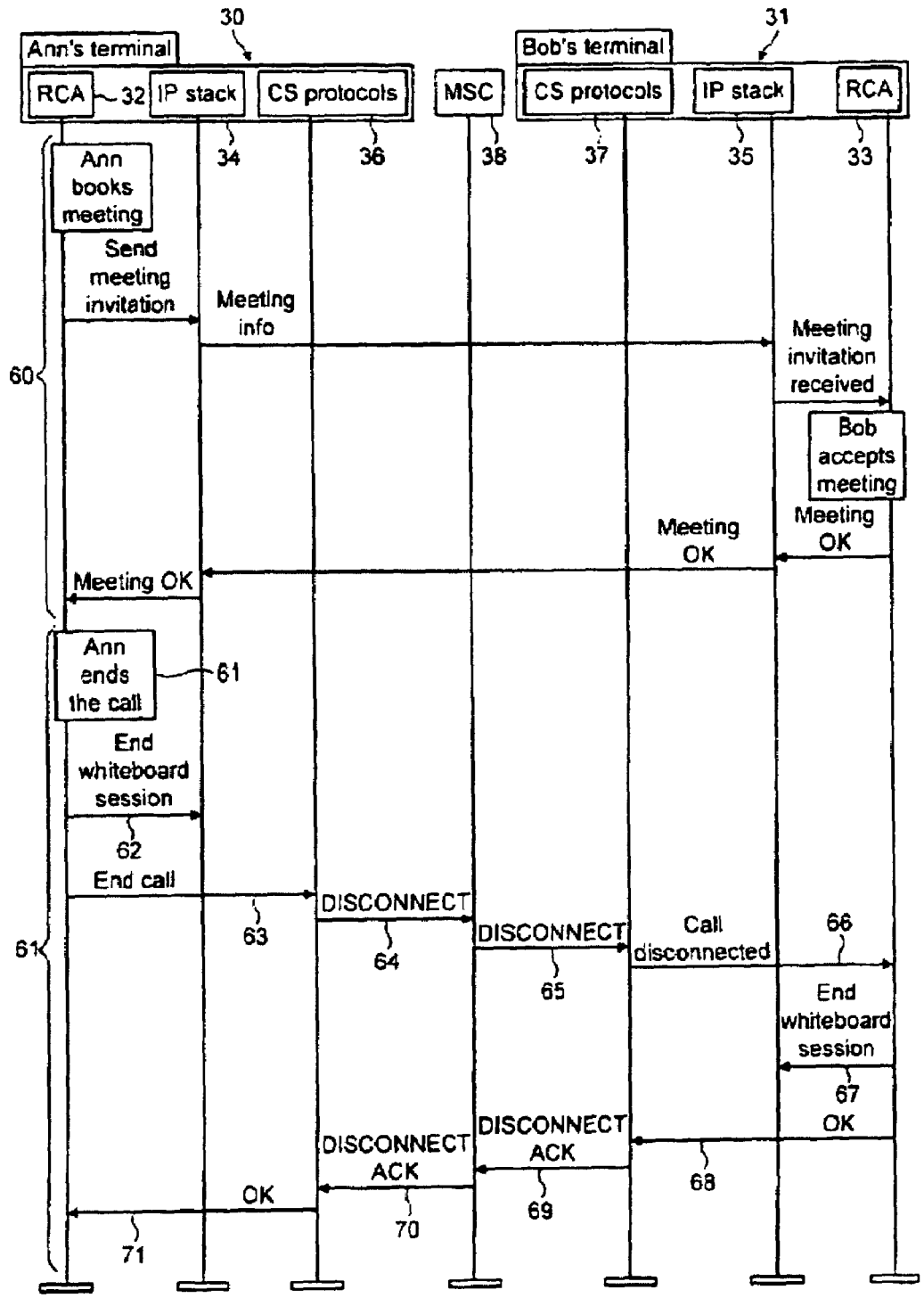
FIG. 4 shows message flow during the continuation of a communication session.

As illustrated in FIG. 4, the session may continue by Ann requesting to book a meeting with Bob. To do so, meeting information is exchanged as illustrated generally at 60 using a further PS exchange. This exchange does not result in an ongoing communication session/channel of the form illustrated at 59.

When the call is to be ended Ann signals the RCA 32 that the call is to be ended (at 61). The RCA signals the IP stack 34 that the ongoing whiteboard session is to be ended (at 62) and signals the CS protocols 36 that the CS call is to be ended (at 62, 63). Disconnect messages 64, 65 are sent in the normal way. The CS protocols 37 inform the RCA 33 of the party that did not initiate the termination that the call is to be disconnected (at 66). That RCA 33 informs the IP stack 35 that the whiteboard session is to be ended and acknowledges to the CS protocols the disconnection of the call (at 67 and 68). Acknowledgements 69, 70 71 are then sent in the normal way. The CS and PS connections are handled as a single logical communication arrangement. This linkage of the connections means that it is straightforward for the terminal to terminate one of the connections if the other is terminated.

The end-user application manages the number and nature of the connections transparently from the user's point of view, so that for the user the connections can be made and terminated straightforwardly even though they are of different types.

Figure 5:
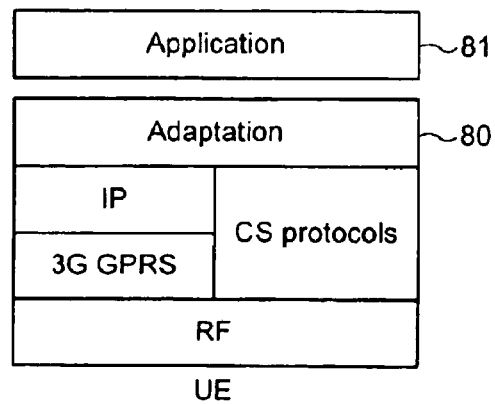
FIG. 5 shows another simplified functional architecture of a user equipment terminal.
Figure 6:
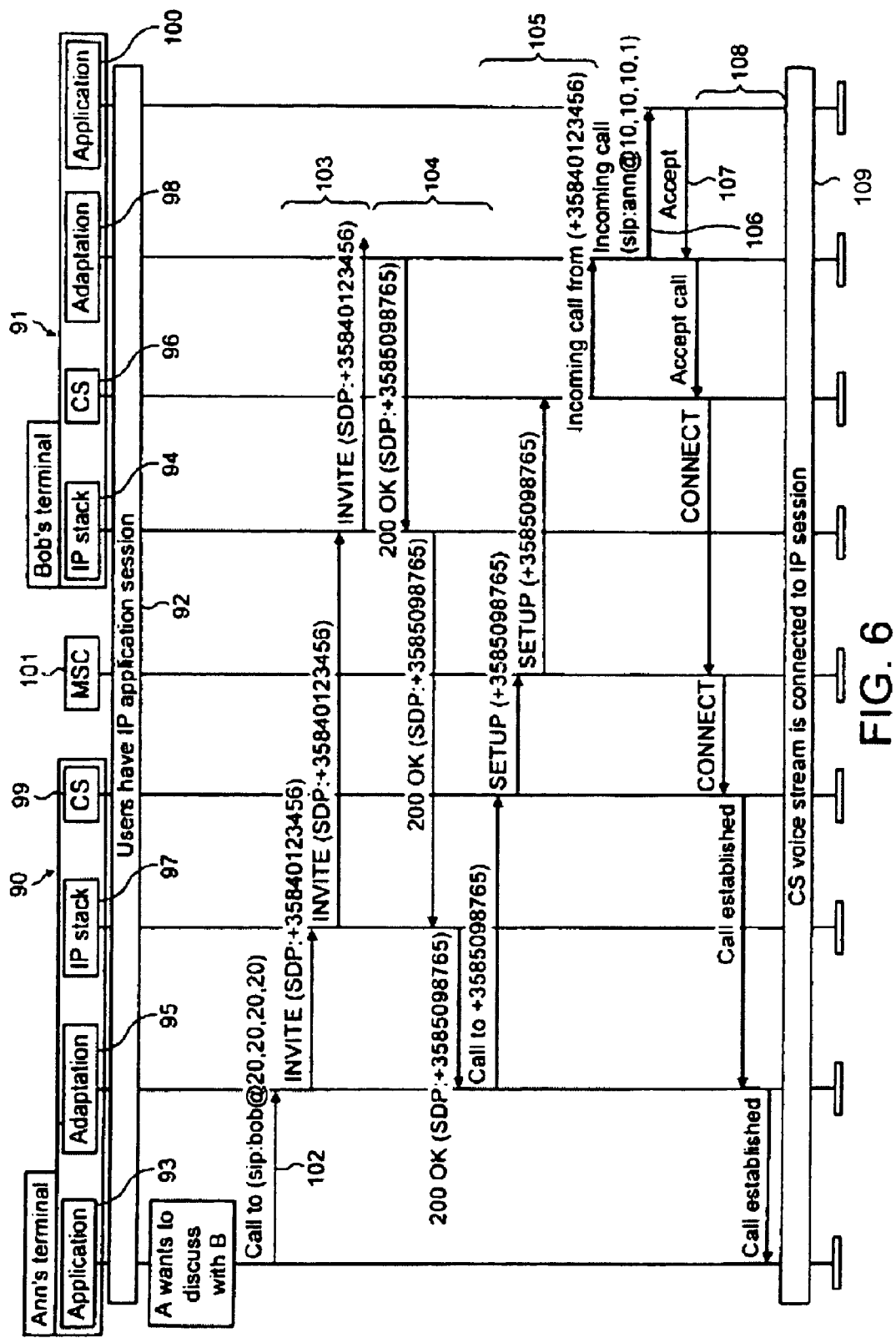
FIG. 6 shows message flow during the continuation of a packet switched communication session by a circuit switched connection.

FIGS. 5 and 6 illustrate another arrangement. In the embodiment of FIGS. 5 and 6 the terminals of A and B include an adaptation layer 80 (see FIG. 5). The adaptation layer allows the establishment of CS or PS calls to be transparent to the application 81 that is running on the terminal. The adaptation layer can be provided in the terminals independently of any application that is to run on them. The adaptation layer sits between the application and the CS and PS communication layers. When the application issues a request for a connection the adaptation layer interprets that request and passes it to the CS or PS layers as appropriate.

FIG. 6 shows an example of an operation that is supported by terminals having the architecture shown in FIG. 5. In the example of FIG. 6 it is supposed that two terminals 90, 91 are already communicating by means of a packet switched connection (see 92). The terminals have application layers 93, 94; adaptation layers 95, 91; IP stacks 97, 98 and circuit switched protocol stacks 99, 100. The terminals can communicate for CS calls via MSC 101.

User A decides to initiate a voice call with user B. User A signals the application layer 93 of her terminal to indicate that the voice call should be initiated (at 102). Since the terminals are already engaged in a PS call, in this example it is supposed that the application layer initiates the voice call by means of a request (formatted for example as indicated in FIG. 6) based on the address of the counterpart terminal as appropriate for a PS connection, e.g. in SIP (session initiation protocol) format. The adaptation layer could attempt to initiate the voice call over a PS link. However, in this example it is assumed that the adaptation layer decides that a CS bearer should be used. This decision could be made based on the adaptation unit's knowledge of the network's capabilities. As shown in FIG. 6, the adaptation layer sends an SIP INVITE message via the IP stack 97 to B's terminal. The INVITE message contains SIP parameters indicating that a CS bearer should be used and indicates the MSISDN of A's terminal (see 103). Knowledge of this MSISDN will enable B's terminal to identify the call when the setup request for the call arrives at B's terminal.

The adaptation layer in B's terminal detects the incoming INVITE message. Since the form of the INVITE message indicates a request for an incoming CS call it responds with a 200 OK message including the MSISDN of terminal B (see 104). Knowledge of the MSISDN of terminal B will enable terminal A to call that MSISDN to set up the impending CS call.

When the OK message with the MSISDN of terminal B arrives at terminal A the adaptation layer 95 of terminal A begins to establish a call to that MSISDN (see 105). The Adaptation layer 98 of the receiving terminal compares the MSISDN of the incoming call to the one received in step 103. Since they match, it informs the application layer 100 of terminal B of the incoming call (at 106). The application layer 100 which responds with an acceptance message 107 and in response the adaptation layer 98 accepts the CS call (at 108). The CS call is then established (at 109) at the same time, and between the same end-points as the original IP connection 92.

The same procedure can be used if SIP proxies (or CSCFs) are involved.

Other means may De used to establish the PS connection.

If two conventional GPRS (general packet radio service) terminals are engaged in a circuit-switches call, each knows the other's E.164 number, but neither necessarily knows the other's IP address as assigned by the GGSN. In this case, if a PS connection is then to be established in parallel with the existing CS connection there is a need for a means for the terminals to access each other's IP address and any necessary firewall and/or proxy traversal information.

In this situation the SIP protocol (RFC-2543), which was originally designed for voice-over-IP calls, can be used whilst the CS call is in progress. In order to determine the SIP URL of a CS user, there is preferably a predefined mapping from E.164 identities to SIP URLs. This mapping may make use of a predefined logic, or may be stored as a look-up table. Such address mapping can be performed by the SIP proxy in the network (120 in FIG. 1). It may implement a simple mapping table, or may use a more complex database which has to be searched to determine a mapping. In the former solution, the look-up table could list the SIP proxy corresponding to each E.164 number, for example:

| E.164 Number | SIP Proxy | Operator |
|---|---|---|
| +358 40 | sip.soneragprs.fi | SONERA |
| +358 41 | sipgw.teliagprs.com | TELIA |
| +1 30 | mcigprs.com | MCI |

In the latter solution, the SIP proxy may provide in essence a DNS (domain name service) query service using DNS SRV records.

During a CS Ball, users know the E.164 address of the remote party. The application at an initiating terminal that is to initiate the PS bearer connection to another terminal uses the E.164 address to create a SIP INVITE (or SIP INFO) message and sends it to the local SIP proxy. The destination is the E.164 number of the other party (sent with a tag to indicate that the address is a phone number instead of a user name) and that local proxy uses its mapping table (or a more complex scheme) to determine the corresponding destination SIP proxy. The identity of the destination SIP proxy is returned to the initiating terminal. The initiating terminal sends an INVITE (or INFO) message to that destination proxy indicating the E.164 identity of the other terminal. The destination proxy determines the SIP URL address that has been allocated to the terminal using that E.164 identity. The destination proxy can then forward that request to the said other terminal by means of its IP address, and the setup of the PS connection can continue generally as normal. Note that the destination proxy can determine from the fact that there is no session information in the payload of the INVITE (or INFO) message that the message does not indicate a call setup.

Appropriate billing procedures can be applied, for example based on the parsed payload type or the size of the data to be transported. For example large uncompressed image files can be made more costly to transfer than smaller compressed image files. The SIP proxies can also maintain a register service which can apply different functions depending on the time of day, payload type etc. For instance, a user may define that if he receives a GIF image and the time is after 16:00 then the image is forwarded to an assigned e-mail address.

Alternatively, the SIP INVITE or INFO messages themselves could be used for transferring user data.

The present invention has been described with specific reference to the UMTS and GPRS systems. However, it is not limited to these systems.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A system, comprising:
a network having a first network access point and a second network access point and configured to carry data between the first network access point and the second access point using a packet-switched bearer and a circuit-switched bearer; and
a first terminal configured to connect to the first network access point and a second terminal configured to connect to the second network access point, each terminal being configured to support simultaneously a connection of a first bearer type and a connection of a second bearer type with the other terminal via the network as a single logical communication arrangement, wherein the first bearer type is a packet-switched bearer and the second bearer type is a circuit-switched bearer or vice versa, wherein the connection of the first bearer type is configured to be established at the commencement of communication between the terminals using addresses of the first bearer type of the respective terminals, and the connection of the second bearer type is configured to be subsequently established between the terminals when a new type of data is introduced into the communication, transmission of which is better supported by a connection of the second bearer type,
wherein each terminal is configured to establish the connection of the second bearer type using an address of the second bearer type of the other terminal, and
wherein the addresses of the first bearer type of the respective terminals are different from the addresses of the second bearer type of the respective terminals.

2. The system of claim 1, wherein the terminals are configured to perform an operation to establish the simultaneous packet-switched and circuit-switched connections by
establishing the circuit-switched connection, and
each terminal transmitting the terminal's packet-switching address to the other terminal using the circuit-switched connection.

3. The system of claim 2, wherein the terminals are configured to establish the packet-switched connection using the packet-switching addresses transmitted over the circuit-switched connection.

4. The system of claim 1, wherein the terminals are configured to perform an operation to establish the simultaneous packet-switched and circuit-switched connections by
establishing the circuit-switched connection, and
each terminal communicating with a proxy server of the network to obtain from the proxy server the packet-switching address of the other terminal.

5. The system of claim 4, wherein each terminal is configured to provide the respective proxy server with a network address of the other terminal and the proxy server is configured to be responsive to that address to provide the packet-switching address of that other terminal.

6. The system of claim 4, wherein the terminals are configured to establish the packet-switched connection using the packet-switching addresses obtained using the proxy.

7. The system of claim 2, wherein the packet-switching addresses are internet protocol addresses.

8. The system of claim 2, wherein the packet-switched addresses are transmitted to the terminals using user-to-user signaling.

9. The system of claim 2, wherein the packet-switched addresses are transmitted to the terminals using the session description protocol.

10. The system of claim 1, wherein the terminals are configured to perform an operation to establish the simultaneous packet-switched and circuit-switched connections by
establishing the packet-switched connection, and
each terminal transmitting the terminal's circuit-switching address to the other terminal using the packet-switched connection.

11. The system of claim 10, wherein the terminals are configured to establish the circuit-switched connection using the terminals' circuit-switching addresses transmitted over the packet-switched connection.

12. The system of claim 10, wherein the terminals' circuit-switching addresses are mobile subscriber integrated services digital network identities.

13. The system of claim 10, wherein the terminals' circuit-switching addresses are transmitted using the session initiation protocol.

14. A method, comprising:
communicating between a first terminal and a second terminal using a communication system comprising a network having a first network access point and a second network access point and configured to carry data between the first network access point and the second access point using a packet-switched bearer and a circuit-switched bearer;
connecting the first terminal to the first network access point;
connecting the second terminal to the second network access point; and
simultaneously supporting, using each of the terminals, a packet-switched connection and a circuit-switched connection with the other terminal via the network as a single logical communication arrangement;
establishing a connection of one bearer type is established at the commencement of communication between the terminals using addresses of the first bearer type of the respective terminals, and a connection of the other bearer type is subsequently established between the terminals when a new type of data is introduced into the communication, transmission of which is better supported by a connection of the other bearer type; and
configuring each terminal to establish the connection of the second bearer type using an address of the second bearer type of the other terminal, wherein the first bearer type is a packet-switched bearer and the second bearer type is a circuit-switched bearer or vice versa,
wherein the addresses of the first bearer type of the respective terminals is different from the addresses of the second bearer type of the respective terminals.

15. The method as claimed in claim 14, further comprising:
configuring the terminals to perform an operation to establish the simultaneous packet-switched and circuit-switched connections;
establishing the circuit-switched connection; and
transmitting, by each terminal, the terminal's respective packet-switching address to the other terminal using the circuit-switched connection.

16. The method as claimed in claim 15, further comprising:
configuring the terminals to establish the packet-switched connection using the packet-switching addresses transmitted over the circuit-switched connection.

17. The method as claimed in claim 15, further comprising:
configuring the terminals to perform an operation to establish the simultaneous packet-switched and circuit-switched connections by
establishing the circuit-switched connection, and
each terminal communicating with a proxy server of the network to obtain from the proxy server the packet-switching address of the other terminal.

18. The method as claimed in claim 17, further comprising:
configuring each terminal to provide the respective proxy server with a network address of the other terminal; and
configuring the proxy server to be responsive to that address to provide the packet-switching address of that other terminal.

19. The method as claimed in claim 17, further comprising:
configuring the terminals to establish the packet-switched connection using the packet-switching addresses obtained using the proxy.

20. The method as claimed in claim 14, further comprising:
configuring the packet-switching addresses to be internet protocol addresses.

21. The method as claimed in claim 14, further comprising:
transmitting the packet-switched addresses to the terminals using user-to-user signaling.

22. The method as claimed in claim 14, further comprising:
transmitting the packet-switched addresses to the terminals using the session description protocol.

23. The method as claimed in claim 14, further comprising:
configuring the terminals to perform an operation to establish the simultaneous packet-switched and circuit-switched connections by
establishing the packet-switched connection, and
each terminal transmitting the terminal's circuit-switching address to the other terminal using the packet-switched connection.

24. The method as claimed in claim 23, further comprising:
configuring the terminals to establish the circuit-switched connection using the circuit-switching addresses transmitted over the packet-switched connection.

25. The method as claimed in claim 23, further comprising:
configuring the circuit-switching addresses to be mobile subscriber integrated services digital network identities.

26. The method as claimed in claim 22, further comprising:
transmitting the circuit-switching addresses using the session initiation protocol.

27. An apparatus, comprising:
a processor configured to connect to an access point of a network and simultaneously support a connection of a first bearer type and a connection of a second bearer type with another terminal using a packet-switched bearer and a circuit switched bearer via the network as a single logical communication arrangement,
wherein the processor is configured to establish a connection of the first bearer type at a commencement of communication with the other terminal using an address of the first bearer type of the other terminal, and subsequently establish a connection of the second bearer type with the other terminal when a new type of data is introduced into the communication, transmission of which is better supported by a connection of the second bearer type, wherein the first bearer type is a packet-switched bearer and the second bearer type is a circuit-switched bearer or vice versa,
wherein the processor is configured to establish the connection of the second bearer type using an address of the second bearer type of the other terminal, and
wherein the address of the first bearer type of the other terminal is different from the address of the second bearer type of the other terminal.

28. The apparatus of claim 27, wherein the apparatus is configured to perform an operation to establish the simultaneous packet-switched and circuit-switched connections by
establishing the circuit-switched connection, and
transmitting the apparatus' packet-switching address to the other terminal using the circuit-switched connection.

29. The apparatus of claim 27, wherein the apparatus is configured to establish the packet-switched connection using the packet-switching addresses transmitted over the circuit-switched connection.

30. The apparatus of claim 27, wherein the apparatus is configured to perform an operation to establish the simultaneous packet-switched and circuit-switched connections by
establishing the circuit-switched connection, and
communicating with a proxy server of the network to obtain from the proxy server the packet-switching address of the other terminal.

31. The apparatus of claim 30, wherein the apparatus is configured to provide the respective proxy server with a network address of the other terminal.

32. The apparatus of claim 30, wherein the apparatus is configured to establish the packet-switched connection using the packet-switching addresses obtained using the proxy.

33. The apparatus of claim 27, wherein the packet-switching addresses are internet protocol addresses.

34. The apparatus of claim 27, wherein the apparatus is configured to perform an operation to establish the simultaneous packet-switched and circuit-switched connections by
establishing the packet-switched connection, and
transmitting the apparatus' circuit-switching address to the other terminal using the packet-switched connection.

35. The apparatus of claim 27, wherein the apparatus is configured to establish the circuit-switched connection using the circuit-switching addresses transmitted over the packet-switched connection.

36. The apparatus of claim 27, wherein the circuit-switching addresses are mobile subscriber integrated services digital network identities.

37. A method, comprising:
operating a terminal, the terminal being configured to connect to an access point of a network and to support simultaneously a connection of a first bearer type and a connection of a second bearer type with an other terminal using a packet switched bearer and a circuit switched bearer via the network as a single logical communication arrangement;
establishing a connection of the first bearer type at the commencement of communication with the other terminal using an address of the first bearer type of the other terminal, and subsequently establishing a connection of the second bearer type with the other terminal when a new type of data is introduced into the communication, transmission of which is better supported by a connection of the second bearer type, wherein the first bearer type is a packet-switched bearer and the second bearer type is a circuit-switched bearer or vice versa; and
using an address of the second bearer type of the other terminal to establish the connection of the second bearer type,
wherein the address of the first bearer type of the other terminal is different from the address of the second bearer type of the other terminal.

38. The method as claimed in claim 37, further comprising:
configuring the terminal to perform an operation to establish the simultaneous packet-switched and circuit-switched connections by
establishing the circuit-switched connection, and
transmitting the terminal's packet-switching address to the other terminal using the circuit-switched connection.

39. The method as claimed in claim 38, further comprising:
configuring the terminal to establish the packet-switched connection using the packet-switching addresses transmitted over the circuit-switched connection.

40. The method as claimed in claim 38, further comprising:
configuring the terminal to perform an operation to establish the simultaneous packet-switched and circuit-switched connections by
establishing the circuit-switched connection, and
communicating with a proxy server of the network to obtain from the proxy server the packet-switching address of the other terminal.

41. The method as claimed in claim 40, further comprising:
configuring the terminal to provide the respective proxy server with a network address of the other terminal; and
configuring the proxy server to be responsive to that address to provide the packet-switching address of that other terminal.

42. The method as claimed in claim 40, further comprising:
configuring the terminal to establish the packet-switched connection using the packet-switching addresses obtained using the proxy.

43. The method as claimed in claim 37, further comprising:
configuring the packet-switching addresses to be internet protocol addresses.

44. The method as claimed in claim 37, further comprising:
configuring the terminal to perform an operation to establish the simultaneous packet-switched and circuit-switched connections by
establishing the packet-switched connection, and
transmitting the terminal's circuit-switching address to the other terminal using the packet-switched connection.

45. The method as claimed in claim 44, further comprising:
configuring the terminal to establish the circuit-switched connection using the circuit-switching addresses transmitted over the packet-switched connection.

46. The method as claimed in claim 44, further comprising:
configuring the circuit-switching addresses to be mobile subscriber integrated services digital network identities.

47. A terminal application, configured to:
operate in a terminal configured to connect to an access point of a network and to support simultaneously a connection of a first bearer type and a connection of a second bearer type with an other terminal using a packet switched bearer and a circuit switched bearer via the network as a single logical communication arrangement; and
establish a connection of the first bearer type at the commencement of communication with the other terminal using an address of the first bearer type of the other terminal, and subsequently establish a connection of the second bearer type with the other terminal when a new type of data is introduced into the communication, transmission of which is better supported by a connection of the second bearer type, wherein the first bearer type is a packet-switched bearer and the second bearer type is a circuit-switched bearer or vice versa,
wherein the terminal is configured to establish the connection of the second bearer type using an address of the second bearer type of the other terminal, and
wherein the address of the first bearer type of the other terminal is different from the address of the second bearer type of the other terminal.

48. The application as claimed in claim 47, wherein the application is configured to perform an operation to establish the simultaneous packet-switched and circuit-switched connections by
establishing the circuit-switched connection, and
transmitting the terminal's packet-switching address to the other terminal using the circuit-switched connection.

49. The application as claimed in claim 47, wherein the application is configured to establish the packet-switched connection using the packet-switching addresses transmitted over the circuit-switched connection.

50. The application as claimed in claim 47, wherein the application is configured to perform an operation to establish the simultaneous packet-switched and circuit-switched connections by
establishing the circuit-switched connection, and
communicating with a proxy server of the network to obtain from the proxy server the packet-switching address of the other terminal.

51. The application as claimed in claim 50, wherein the application is configured to provide the respective proxy server with a network address of the other terminal.

52. The application as claimed in claim 50, wherein the application is configured to establish the packet-switched connection using the packet-switching addresses obtained using the proxy.

53. The application as claimed in claim 47, wherein the packet-switching addresses are internet protocol addresses.

54. The application as claimed in claim 47, wherein the application is configured to perform an operation to establish the simultaneous packet-switched and circuit-switched connections by
establishing the packet-switched connection, and
transmitting the terminal's circuit-switching address to the other terminal using the packet-switched connection.

55. The application as claimed in claim 47, wherein the application is configured to establish the circuit-switched connection using the circuit-switching addresses transmitted over the packet-switched connection.

56. The application as claimed in claim 47, wherein the circuit-switching addresses are mobile subscriber integrated services digital network identities.

57. A method, comprising:
operating an application for a terminal, the terminal being configured to connect to an access point of a network and to support simultaneously a connection of a first bearer type and a connection of a second bearer type with an other terminal using a packet switched bearer and a circuit switched bearer via the network as a single logical communication arrangement;
establishing a connection of the first bearer type at the commencement of communication with the other terminal using an address of the first bearer type of the other terminal, and subsequently establishing a connection of the second bearer type with the other terminal when a new type of data is introduced into the communication, transmission of which is better supported by a connection of the second bearer type, wherein the first bearer type is a packet-switched bearer and the second bearer type is a circuit-switched bearer or vice versa; and
establishing the connection of the second bearer type using an address of the second bearer type of the other terminal,
wherein the address of the first bearer type of the other terminal is different from the address of the second bearer type of the other terminal.

58. The method as claimed in claim 57, further comprising:
configuring the application to perform an operation to establish the simultaneous packet-switched and circuit-switched connections by
establishing the circuit-switched connection, and
transmitting the terminal's packet-switching address to the other terminal using the circuit-switched connection.

59. The method as claimed in claim 58, further comprising:
configuring the application to establish the packet-switched connection using the packet-switching addresses transmitted over the circuit-switched connection.

60. The method as claimed in claim 58, further comprising:
configuring the application to perform an operation to establish the simultaneous packet-switched and circuit-switched connections by
establishing the circuit-switched connection, and
communicating with a proxy server of the network to obtain from the proxy server the packet-switching address of the other terminal.

61. The method as claimed in claim 60, further comprising:
configuring the application to provide the respective proxy server with a network address of the other terminal; and
configuring the proxy server to be responsive to that address to provide the packet-switching address of that other terminal.

62. The method as claimed in claim 60, further comprising:
configuring the application to establish the packet-switched connection using the packet-switching addresses obtained using the proxy.

63. The method as claimed in claim 57, further comprising:
configuring the packet-switching addresses to be internet protocol addresses.

64. The method as claimed in claim 57, further comprising:
configuring the application to perform an operation to establish the simultaneous packet-switched and circuit-switched connections by
establishing the packet-switched connection, and
transmitting the terminal's circuit-switching address to the other terminal using the packet-switched connection.

65. The method as claimed in claim 64, further comprising: configuring the application to establish the circuit-switched connection using the circuit-switching addresses transmitted over the packet-switched connection.

66. The method as claimed in claim 64, further comprising: configuring the circuit-switching addresses to be mobile subscriber integrated services digital network identities.

67. The system of claim 1, wherein the terminals' packet-switching addresses are session initiation protocol addresses.

68. The apparatus of claim 27, wherein the terminal's packet-switching address is a session initiation protocol address.

69. The method as claimed in claim 37, wherein the terminals' packet-switching addresses are session initiation protocol addresses.

70. The terminal application as claimed in claim 47, wherein the terminal's packet-switching address is a session initiation protocol address.

71. The method as claimed in claim 57, wherein the terminal's packet-switching address is a session initiation protocol address.

72. A computer program tangibly embodied on a computer readable storage medium operable to control an apparatus in a terminal, the terminal being configured to connect to an access point of a network and to support simultaneously a connection of a first bearer type and a connection of a second bearer type with an other terminal using a packet-switched bearer and a circuit switched bearer via the network as a single logical communication arrangement; the computer program being configured to perform the following:
establish a connection of the first bearer type at the commencement of communication with the other terminal using an address of the first bearer type of the other terminal, and subsequently establish a connection of the second bearer type with the other terminal when a new type of data is introduced into the communication, transmission of which is better supported by a connection of the second bearer type wherein the first bearer type is a packet-switched bearer and the second bearer type is a circuit-switched bearer or vice versa,
wherein the computer program is configured to establish the connection of the second bearer type using an address of the second bearer type of the other terminal, and
wherein the address of the first bearer type of the other terminal is different from the address of the second bearer type of the other terminal.

73. An apparatus, configured to:
operate in a terminal, the terminal being configured to connect to an access point of a network and to support simultaneously a connection of a first bearer type and a connection of a second bearer type with an other terminal using a packet-switched bearer and a circuit switched bearer via the network as a single logical communication arrangement;
establish a connection of the first bearer type at the commencement of communication with the other terminal using an address of the first bearer -type of the other terminal, and subsequently establishing a connection of the second bearer type with the other terminal when a new type of data is introduced into the communication, transmission of which is better supported by a connection of the second bearer type, wherein the first bearer type is a packet-switched bearer and the second bearer type is a circuit-switched bearer or vice versa; and
use an address of the second bearer type of the other terminal to establish the connection of the second bearer type,
wherein the address of the first bearer type of the other terminal is different from the address of the second bearer type of the other terminal.

74. The apparatus as claimed in claim 73, wherein the apparatus is configured to perform an operation to establish the simultaneous packet-switched and circuit-switched connections by
establishing the circuit-switched connection, and
transmitting the terminal's packet-switching address to the other terminal using the circuit-switched connection.

75. The apparatus as claimed in claim 73, wherein the apparatus is configured to establish the packet-switched connection using the packet-switching addresses transmitted over the circuit-switched connection.

76. The apparatus as claimed in claim 73, wherein the apparatus is configured to perform an operation to establish the simultaneous packet-switched and circuit-switched connections by
establishing the circuit-switched connection, and
communicating with a proxy server of the network to obtain from the proxy server the packet-switching address of the other terminal.

77. The apparatus as claimed in claim 76, wherein the apparatus is configured to provide the respective proxy server with a network address of the other terminal.

78. The apparatus as claimed in claim 76, wherein the apparatus is configured to establish the packet-switched connection using the packet-switching addresses obtained using the proxy.

79. The apparatus as claimed in claim 73, wherein the terminal's packet-switching address is an internet protocol addresses.

80. The apparatus as claimed in claim 73, wherein the apparatus is configured to perform an operation to establish the simultaneous packet-switched and circuit-switched connections by
establishing the packet-switched connection, and
transmitting the terminal's circuit-switching address to the other terminal using the packet-switched connection.

81. The apparatus as claimed in claim 73, wherein the apparatus is configured to establish the circuit-switched connection using the circuit-switching addresses transmitted over the packet-switched connection.

82. The apparatus as claimed in claim 73, wherein the terminal's circuit-switching address is a mobile subscriber integrated services digital network identity.

83. The apparatus as claimed in claim 73, wherein the terminal's packet-switching address is a session initiation protocol address.

84. A system, comprising:
a network having a first network access point and a second network access point and configured to carry data between the first network access point and the second access point using a packet-switched bearer and a circuit-switched bearer; and
a first terminal configured to connect to the first network access point and a second terminal configured to connect to the second network access point, each terminal being configured to support simultaneously a connection of a first bearer type and a connection of a second bearer type with the other terminal via the network as a single logical communication arrangement, wherein the first bearer type is a packet-switched bearer and the second bearer type is a circuit-switched bearer or vice versa, wherein the connection of the first bearer type is configured to be established at the commencement of communication between the terminals using addresses of the first bearer type of the respective terminals, and the connection of the second bearer type is configured to be subsequently established between the terminals when a new type of data is introduced into the communication, transmission of which is better supported by a connection of the second bearer type, wherein each terminal is configured to establish the connection of the second bearer type using an address of the second bearer type of the other terminal, and wherein the addresses of the first bearer type of the respective terminals are different from the addresses of the second bearer type of the respective terminals;

wherein the terminals are configured to perform an operation to establish the simultaneous packet-switched and circuit-switched connections by establishing the circuit-switched connection, and each terminal communicating with a proxy server of the network to obtain from the proxy server the packet-switching address of the other terminal; and wherein each terminal is configured to provide the respective proxy server with a network address of the other terminal and the proxy server is configured to be responsive to that address to provide the packet-switching address of that other terminal.

85. A method, comprising:

communicating between a first terminal and a second terminal using a communication system comprising a network having a first network access point and a second network access point and configured to carry data between the first network access point and the second access point using a packet-switched bearer and a circuit-switched bearer;

connecting the first terminal to the first network access point;

connecting the second terminal to the second network access point; and simultaneously supporting, using each of the terminals, a packet-switched connection and a circuit-switched connection with the other terminal via the network as a single logical communication arrangement;

establishing a connection of one bearer type is established at the commencement of communication between the terminals using addresses of the first bearer type of the respective terminals, and a connection of the other bearer type is subsequently established between the terminals when a new type of data is introduced into the communication, transmission of which is better supported by a connection of the other bearer type; and configuring each terminal to establish the connection of the second bearer type using an address of the second bearer type of the other terminal, wherein the first bearer type is a packet-switched bearer and the second bearer type is a circuit-switched bearer or vice-versa and the addresses of the first bearer type of the respective terminals is different from the addresses of the second bearer type of the respective terminals;

configuring the terminals to perform an operation to establish the simultaneous packet-switched and circuit-switched connections;

establishing the circuit-switched connection; and transmitting, by each terminal, the terminal's respective packet-switching address to the other terminal using the circuit-switched connection;

each terminal communicating with a proxy server of the network to obtain from the proxy server the packet-switching address of the other terminal;

configuring each terminal to provide the respective proxy server with a network address of the other terminal; and configuring the proxy server to be responsive to that address to provide the packet-switching address of that other terminal.

86. An apparatus, comprising:

a processor configured to connect to an access point of a network and simultaneously support a connection of a first bearer type and a connection of a second bearer type with another terminal using a packet-switched bearer and a circuit switched bearer via the network as a single logical communication arrangement, wherein the processor is configured to establish a connection of the first bearer type at a commencement of communication with the other terminal using an address of the first bearer type of the other terminal, and subsequently establish a connection of the second bearer type with the other terminal when a new type of data is introduced into the communication, transmission of which is better supported by a connection of the second bearer type, wherein the first bearer type is a packet-switched bearer and the second bearer type is a circuit-switched bearer or vice versa, wherein the processor is configured to establish the connection of the second bearer type using an address of the second bearer type of the other terminal, and wherein the address of the first bearer type of the other terminal is different from the address of the second bearer type of the other terminal wherein the processor is configured to perform an operation to establish the simultaneous packet-switched and circuit-switched connections by establishing the circuit-switched connection, and communicating with a proxy server of the network to obtain from the proxy server the packet-switching address of the other terminal; and the processor is configured to provide the respective proxy server with a network address of the other terminal.

87. A method, comprising:

operating a terminal, the terminal being configured to connect to an access point of a network and to support simultaneously a connection of a first bearer type and a connection of a second bearer type with an other terminal using a packet switched bearer and a circuit switched bearer via the network as a single logical communication arrangement;

establishing a connection of the first bearer type at the commencement of communication with the other terminal using an address of the first bearer type of the other terminal, and subsequently establishing a connection of the second bearer type with the other terminal when a new type of data is introduced into the communication, transmission of which is better supported by a connection of the second bearer type, wherein the first bearer type is a packet-switched bearer and the second bearer type is a circuit-switched bearer or vice versa; and using an address of the second bearer type of the other terminal to establish the connection of the second bearer type, wherein the address of the first bearer type of the other terminal is different from the address of the second bearer type of the other terminal;

configuring the terminal to perform an operation to establish the simultaneous packet-switched and circuit-switched connections by
    establishing the circuit-switched connection, and
    transmitting the terminal's packet-switching address to the other terminal using the circuit-switched connection;
    communicating with a proxy server of the network to obtain from the proxy server the packet-switching address of the other terminal;
    configuring the terminal to provide the respective proxy server with a network address of the other terminal; and
configuring the proxy server to be responsive to that address to provide the packet-switching address of that other terminal.

88. A terminal application, configured to:
operate in a terminal configured to connect to an access point of a network and to support simultaneously a connection of a first bearer type and a connection of a second bearer type with an other terminal using a packet switched bearer and a circuit switched bearer via the network as a single logical communication arrangement; and
establish a connection of the first bearer type at the commencement of communication with the other terminal using an address of the first bearer type of the other terminal, and subsequently establish a connection of the second bearer type with the other terminal when a new type of data is introduced into the communication, transmission of which is better supported by a connection of the second bearer type, wherein the first bearer type is a packet-switched bearer and the second bearer type is a circuit-switched bearer or vice versa,
wherein the terminal is configured to establish the connection of the second bearer type using an address of the second bearer type of the other terminal, and
wherein the address of the first bearer type of the other terminal is different from the address of the second bearer type of the other terminal;
wherein the application is configured to perform an operation to establish the simultaneous packet-switched and circuit-switched connections by
    establishing the circuit-switched connection, and
    communicating with a proxy server of the network to obtain from the proxy server the packet-switching address of the other terminal;
wherein the application is configured to provide the respective proxy server with a network address of the other terminal.

89. A method, comprising:
operating an application for a terminal, the terminal being configured to connect to an access point of a network and to support simultaneously a connection of a first bearer type and a connection of a second bearer type with an other terminal using a packet switched bearer and a circuit switched bearer via the network as a single logical communication arrangement;
establishing a connection of the first bearer type at the commencement of communication with the other terminal using an address of the first bearer type of the other terminal, and subsequently establishing a connection of the second bearer type with the other terminal when a new type of data is introduced into the communication, transmission of which is better supported by a connection of the second bearer type, wherein the first bearer type is a packet-switched bearer and the second bearer type is a circuit-switched bearer or vice versa; and
establishing the connection of the second bearer type using an address of the second bearer type of the other terminal,
wherein the address of the first bearer type of the other terminal is different from the address of the second bearer type of the other terminal;
configuring the application to perform an operation to establish the simultaneous packet-switched and circuit-switched connections by
    establishing the circuit-switched connection, and
    transmitting the terminal's packet-switching address to the other terminal using the circuit-switched connection;
    communicating with a proxy server of the network to obtain from the proxy server the packet-switching address of the other terminal;
configuring the application to provide the respective proxy server with a network address of the other terminal; and
configuring the proxy server to be responsive to that address to provide the packet- switching address of that other terminal.

90. A computer program tangibly embodied on a computer-readable storage medium operable to control an apparatus in a terminal, the terminal being configured to connect to an access point of a network and to support simultaneously a connection of a first bearer type and a connection of a second bearer type with an other terminal using a packet-switched bearer and a circuit switched bearer via the network as a single logical communication arrangement; the computer program being configured to perform the following:
    establish a connection of the first bearer type at the commencement of communication with the other terminal using an address of the first bearer type of the other terminal, and subsequently establish a connection of the second bearer type with the other terminal when a new type of data is introduced into the communication, transmission of which is better supported by a connection of the second bearer type, wherein the first bearer type is a packet-switched bearer and the second bearer type is a circuit-switched bearer or vice versa,
    wherein the computer program is configured to establish the connection of the second bearer type using an address of the second bearer type of the other terminal, and
    wherein the address of the first bearer type of the other terminal is different from the address of the second bearer type of the other terminal and configure the terminals to perform an operation to establish the simultaneous packet-switched and circuit-switched connections;
    establish the circuit-switched connection; and
    transmit, by each terminal, the terminal's respective packet-switching address to the other terminal using the circuit-switched connection;
    each terminal communicating with a proxy server of the network to obtain from the proxy server the packet-switching address of the other terminal;
    configure each terminal to provide the respective proxy server with a network address of the other terminal; and
    configure the proxy server to be responsive to that address to provide the packet-switching address of that other terminal.

91. An apparatus, configured to:
operate in a terminal, the terminal being configured to connect to an access point of a network and to support simultaneously a connection of a first bearer type and a connection of a second bearer type with an other terminal using a packet-switched bearer and a circuit switched bearer via the network as a single logical communication arrangement;

establish a connection of the first bearer type at the commencement of communication with the other terminal using an address of the first bearer type of the other terminal, and subsequently establishing a connection of the second bearer type with the other terminal when a new type of data is introduced into the communication, transmission of which is better supported by a connection of the second bearer type, wherein the first bearer type is a packet-switched bearer and the second bearer type is a circuit-switched bearer or vice versa; and use an address of the second bearer type of the other terminal to establish the connection of the second bearer type, wherein the address of the first bearer type of the other terminal is different from the address of the second bearer type of the other terminal wherein the apparatus is configured to perform an operation to establish the simultaneous packet-switched and circuit-switched connections by establishing the circuit-switched connection, and communicating with a proxy server of the network to obtain from the proxy server the packet-switching address of the other terminal;

wherein the apparatus is configured to provide the respective proxy server with a network address of the other terminal.

* * * * *